United States Patent
Zhang et al.

(10) Patent No.: US 11,817,944 B2
(45) Date of Patent: Nov. 14, 2023

(54) TIME SYNCHRONIZATION METHOD AND APPARATUS FOR DOMAIN CONTROLLER, DOMAIN CONTROLLER AND STORAGE MEDIUM

(71) Applicant: Black Sesame Technologies Inc., San Jose, CA (US)

(72) Inventors: Jianfeng Zhang, Neijiang (CN); Long Zhang, Shenzhen (CN); Weifu Chen, Chongqing (CN)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/702,493

(22) Filed: Mar. 23, 2022

(65) Prior Publication Data

US 2022/0329335 A1    Oct. 13, 2022

(30) Foreign Application Priority Data

Apr. 9, 2021    (CN) .......................... 202110384961.7

(51) Int. Cl.
*H04J 3/06* (2006.01)
*H04L 49/109* (2022.01)
*H04L 67/12* (2022.01)

(52) U.S. Cl.
CPC .......... *H04J 3/0635* (2013.01); *H04L 49/109* (2013.01); *H04L 67/12* (2013.01)

(58) Field of Classification Search
CPC .............................. H04J 3/0635; H04L 49/109
See application file for complete search history.

(56) References Cited

U.S. PATENT DOCUMENTS

| 2020/0151362 A1* | 5/2020 | Harriman | G06F 21/85 |
| 2020/0412669 A1* | 12/2020 | Schubert | H04L 47/34 |

FOREIGN PATENT DOCUMENTS

| CN | 101645869 A | 2/2010 |
| CN | 103279026 | 9/2013 |
| CN | 203596827 U | 5/2014 |
| CN | 204774933 | 11/2015 |
| CN | 109462454 A | 3/2019 |
| CN | 111897330 | 11/2020 |
| CN | 112514289 A | 3/2021 |
| CN | 112596417 A | 4/2021 |
| WO | 2020020936 A1 | 1/2020 |

* cited by examiner

*Primary Examiner* — Samina F Choudhry
(74) *Attorney, Agent, or Firm* — Timothy T. Wang; Ni, Wang & Massand, PLLC

(57) ABSTRACT

A time synchronization method, apparatus, domain controller, and storage medium are disclosed. The domain controller is mounted in a vehicle and includes a number of SoCs and micro control units. The SoCs and micro control units are respectively, communicatively connected through the controller area network bus and respectively connected to the switch via Ethernet. The switch has external Ethernet interfaces. A main SoC in the number of SoCs has external UART/PPS interfaces and the micro control units have external FlexRay interfaces. The time synchronization method of the domain controller includes any one of the steps of receiving a time service from an external device through the UART/PPS interfaces, receiving a time service from the external device through the switch over the Ethernet interface, or receiving a time service from the external device through the FlexRay interface under a normal operation phase of the vehicle.

11 Claims, 6 Drawing Sheets

TIME SYNCHRONIZATION METHOD AND APPARATUS FOR DOMAIN CONTROLLER, DOMAIN CONTROLLER AND STORAGE MEDIUM

CROSS-REFERENCE TO RELATED APPLICATIONS

The disclosure claims priority to Chinese patent disclosure No. 202110384961.7, filed on Apr. 9, 2021, the entire contents of which are incorporated herein by reference.

TECHNICAL FIELD

The present disclosure relates to the field of in-vehicle electronic technologies, and more specifically, to a time synchronization method and apparatus for a domain controller, domain controller, and storage medium.

BACKGROUND

With the rapid development of autonomous driving technologies, automotive electronic electrical architectures are evolved from traditional distributed electronic control units (ECUs) to centralized central controllers or domain controllers. The domain controller can accomplish tasks such as perception, planning, localization, decision-making, etc. of intelligent driving or autonomous driving, and completes real-time control of the vehicle, which requires the domain controller to not only have strong computing power, but also to ensure functional safety for all tasks to be performed. However, it is often possible to provide a SoC (SOC) of high computing power that cannot all meet the ASIL-D security level requirements from hardware to software, and therefore, the domain controller typically consists of multiple processors, including one or more chip scale SoCs and a micro controller unit (MCU) that conforms to the ASIL-D security level requirements. In which the SoC provides computing power support. The micro control unit is responsible for the system control of the domain controller and in communication with the vehicle chassis to control the vehicle.

Among multiple processors inside the domain controller, high precision time synchronization must be made to cooperatively complete the autonomous driving task. Typically, the delay of all communications within the domain controller should not exceed 1 ms, so the time synchronization accuracy inside the domain controller should also be below 1 ms. The domain controller also typically requires a device, such as an On-Board Unit (OBU) or a Telematics BOX (T-Box), to communicate with a cloud service or road facility, and therefore also needs to implement satellite authorization through a Global Navigation Satellite System (GNSS) receiver to synchronize time to the external absolute time, such as Universal Time Coordinated (UTC) time. Further, some sensors, such as cameras, lidars, millimeter-wave radars, and the like, are all require a time service from the domain controller.

On conventional vehicle electronic electrical architectures, synchronization of electronic control unit time can be accomplished by using a FlexRay bus. Currently, on smart vehicles, it is most common to synchronize schemes at a single time. These methods are only applicable to time synchronization of a single electronic control unit or component, and the scalability is poor, thus failing to meet the diverse time synchronization needs of current automated driving domain controller.

SUMMARY

In view of the above, it is necessary to provide a time synchronization method and apparatus, a domain controller, and a storage medium capable of improving the diversity and scalability of domain controller time synchronization for the above technical problems.

In one aspect, a time synchronization method for a domain controller is provided. The domain controller is mounted in a vehicle and includes a number of system-on-chips (SoCs) and micro control units (MCUs). The number of the SoCs and the MCUs are respectively communicatively connected by a controller area network bus and are respectively communicatively connected to a switch through an Ethernet. The switch has external Ethernet interfaces. A main SoC among the number of the SoCs has external universal asynchronous receiver/transmitter (UART)/pulse per second (PPS) interfaces. Each of the micro control units has an external FlexRay interface. The time synchronization method for a domain controller includes causing the domain controller to, under a normal operating phase of the vehicle, perform any of the steps as follows:
  receiving a time service from an external device through the UART/PPS interfaces;
  receiving a time service from the external device through the Ethernet interfaces via the switch; and
  receiving a time service from the external device through the FlexRay interface.

In on embodiment, the step of receiving a time service from an external device through the UART/PPS interfaces includes the steps of:
  communicatively connecting to global navigation satellite system (GNSS) timing source by the main SoC through the UART/PPS interfaces; receiving the PPS from the GNSS timing source and a coordinated universal time (UTC); and synchronizing a main SoC time to the UTC by the PPS and the UTC;
  taking the synchronized main SoC time as a master clock of a precise clock synchronization protocol in the internal local area network of the domain controller; taking the remaining SoCs among the number of SoCs except the main SoC and the micro control units as the slave clock of the precise clock synchronization protocol; and performing precise clock synchronization protocol time synchronization on the remaining SoCs and the MCU to the synchronized main SoC time; and updating a real time clock time inside the MCU to the main SoC time and stopping broadcasting a time message of the MCU on the controller area network bus after the MCU completes the time synchronization of the precise clock synchronization protocol.

In on embodiment, the step of receiving a time service from the external device through the Ethernet interfaces via the switch includes the steps of:
  communicatively connected to an external clock source by the domain controller through the Ethernet interface via the switch; taking the external clock source as a master clock of the precise clock synchronization protocol; taking the number of the SoCs and the MCUs of the domain controller as slave clocks of the precise clock synchronization protocol; performing precise clock synchronization protocol time synchronization on the number of the SoCs and the micro control unit of the domain controller to the synchronized main SoC time; updating a real time clock time inside the MCU to the main SoC time and stopping broadcasting a time message of the MCU on the controller area network bus after the MCU completes the time synchronization of the precise clock synchronization protocol.

In one embodiment, the step of receiving a time service from the external device through the FlexRay interface includes the steps of:
connecting to a vehicle FlexRay bus, by the MCU, through the FlexRay interface and a FlexRay bus; synchronizing the MCU to a vehicle device time connected to the vehicle FlexRay bus through a FlexRay time;
updating a real time clock time inside the MCU to the vehicle device time and stopping broadcasting a time message of the MCU on the controller area network bus after the MCU completes the time synchronization of the precise clock synchronization protocol;
taking the MCU as a master clock of the precise clock synchronization protocol of an internal local area network of the domain controller; taking the plurality of the SoCs as slave clocks of the precise clock synchronization protocol; performing precise clock synchronization protocol time synchronization on the plurality of the SoCs to the synchronized main SoC time.

In one embodiment, the time synchronization method for a domain controller further includes, under a normal operating phase of the vehicle and after the domain controller accepts the time service, causing the domain controller to perform any one or more of the following steps to provide the time service to one or more external devices:
providing the time service to external devices via the UART/PPS interfaces; providing the time service to external devices through the Ethernet interface via the switch; and providing the time service to external devices via the FlexRay interface.

In one embodiment, during a start-up phase of the vehicle prior to the normal operating phase of the vehicle, the method further includes waking up the MCU in a dormant state through a wake-up message of a controller area network bus of a vehicle, so that the MCU enters a normal working state; powering, resetting each SOC in the plurality of SOCs by the MCU and broadcasting a time message of the MCU generated according to a time count of a real-time clock of the MCU on the controller area network bus; and synchronizing an initial time of each of the SoCs to the time of the MCU by using the time message of the MCU broadcasted on the controller area network bus after each of the SoCs is reset.

In one embodiment, the step of synchronizing an initial time of each of the SoC to the time of the MCU by using the time message of the MCU broadcasted on the controller area network bus after each of the SoCs is reset includes: starting a safety island processor in each of the SoCs after each of the SoCs is reset, receiving the time message of the MCU by the safety island processor through the controller area network bus so as to read a latest initialization time and correct the time of the safety island processor to the latest initialization time; initiating, by the safety island processor in each of the SoCs, a general processor in the SoC where the safety island processor is located; and requesting, by each of the general processor, the current time of the safety island processor in the SoC where the general processor is located through an inter-core communication mode in a starting stage of the embedded system, and synchronizing the time of the embedded system of the general processor to the current time of the safety island processor.

In one embodiment, the time synchronization method for the domain controller further includes recording, by each general processor, a startup log of the startup phase by utilizing the current time of the requested safety island processor during the startup phase of its embedded system.

In one embodiment, in a stop phase of the vehicle before the start phase of the vehicle, the MCU is connected to a power supply of the vehicle and is kept powered on; the SoC is in a power-off state, and the MCU is in a sleep state; the real-time clock of the MCU maintains time counting in the sleep state.

In another aspect, a time synchronization apparatus of a domain controller for performing time synchronization of a domain controller is provided. The domain controller is mounted in a vehicle. The domain controller includes a number of system-on-chips (SoCs) and micro control units (MCUs). The number of SoCs and the MCUs are respectively communicatively connected through a controller area network bus and are respectively connected to a switch through an Ethernet communication. The switch is provided with external Ethernet interfaces. A main SoC in the number of SoCs is provided with an external universal asynchronous receiver/transmitter (UART)/pulse per second (PPS) interface; and each of the MCUs is provided with an external FlexRay interface. The time synchronization apparatus of a domain controller includes a time service accepting module, configured to, enable the domain controller to selectively execute any one of the following steps to accept a time service during a normal working phase of the vehicle: receiving the time service from an external device through the UART/PPS interface; receiving the time service from an external device through the Ethernet interface through the switch; and receiving the time service from an external device through the FlexRay interface.

In another aspect, a domain controller mounted in a vehicle is provided. The domain controller includes a number of system-on-chips (SoCs) and micro control units (MCUs). The number of the SoCs and the MCUs are respectively communicatively connected by a controller area network bus and are respectively communicatively connected to a switch through an Ethernet. The switch is provided with external Ethernet interfaces. A main SoC among the plurality of the SoCs is provided external universal asynchronous receiver/transmitter (UART)/pulse per second (PPS) interfaces; and each of the MCUs is provided with an external FlexRay interface. The domain controller selectively executes any one of the following steps to accept a time service during a normal working phase of the vehicle: receiving the time service from an external device through the UART/PPS interface; receiving the time service from an external device through the Ethernet interface through the switch; and receiving the time service from an external device through the FlexRay interface.

A computer readable storage medium having stored thereon a computer program, the computer program, when executed by a processor, selectively execute any one of the following steps to accept a time service during a normal working phase of the vehicle: receiving the time service from an external device through the UART/PPS interface; receiving the time service from an external device through the Ethernet interface through the switch; and receiving the time service from an external device through the FlexRay interface.

In the time synchronization method, apparatus, computer device, and storage medium of the domain controller described above, the domain controller is mounted in a vehicle, and connected with various interfaces, such as an Ethernet interface, a universal asynchronous receiver/pulse per second interface, and a FlexRay interface. When time synchronization is made to the domain controller, the time synchronization to the domain controller can be accomplished by selecting either of the interfaces according to the actual requirements and accepting an external time service by performing a time synchronization step corresponding to an interface type. As such, between the multiple domain controllers in a vehicle, or between a domain controller and other components of a vehicle, the connections can be flexibly concatenated by a variety of interfaces provided by the domain controller to provide time service to each other, thus effectively improving the diversity of domain controller time synchronization and scalability.

DETAILED DESCRIPTION OF THE EMBODIMENTS

For a clearer understanding of the objects, technical solutions, and advantages of the present application, further detailed description of the disclosure is given below in connection with the accompanying drawings and embodiments. It should be understood that the specific embodiments described herein are merely illustrative of the application and are not intended to limit the application.

Figure 1:
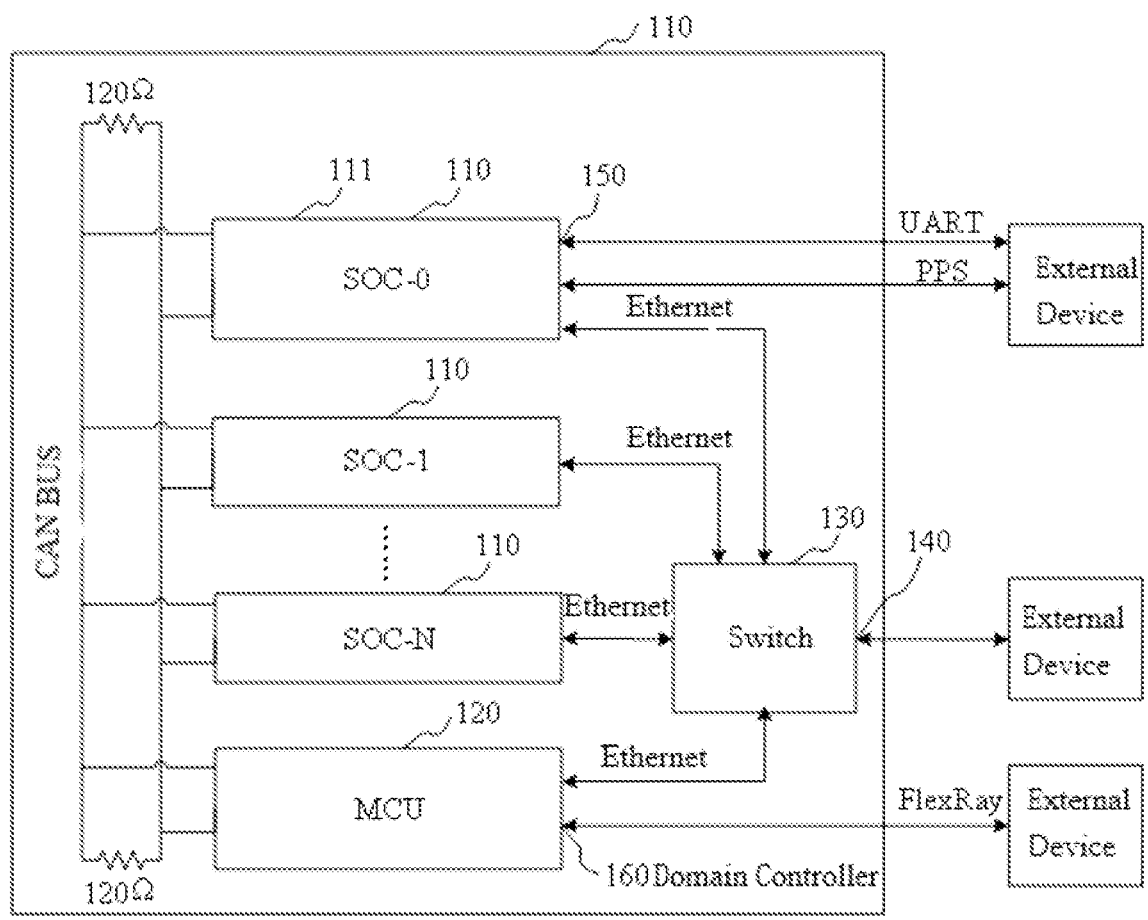
FIG. 1 is a schematic diagram of a domain controller according to one embodiment.

The time synchronization method of the domain controller provided herein can be applied to perform time synchronization for domain controller 100 as shown in FIG. 1. The domain controller 100 is mounted in a vehicle. The domain controller 100 includes a number of System-on-Chip (SOCs) 110 (SOC-0, SOC-1, and SOC-N as shown in the figures) and micro control units (MCUs) 120. The number of SoCs 110 and the micro control units 120 are communicatively connected via a Controller Area Network (CAN) bus, respectively, and are respectively connected to the switch 130 through an Ethernet communication. The switch 130 has external Ethernet interface 140. It is to be understood that the switch 130 can be contained within the domain controller 100 or external to domain controller 100. The main SoC (SOC-0) 111 among the number of SoCs 110 has a Universal Asynchronous Receiver/Transmitter (UART)/Pulse Per Second (PPS) interface 150. The micro control unit 120 has an external FlexRay interface 160.

Among them, the PHY chips and switch chips within the domain controller 110 support IEEE 1588v2. The SoC 110 can be a car-level SoC, for example, a BST A1000 chip introduced by the black sesame smart technology, which provide Ethernet Gigabit Media Access Control (GMAC) supporting the IEEE 1588v2 protocol, a safety island function with a multicore general processor, and has a safety island processor. The micro control unit 120 may be a car-level ASIL-D micro control unit chip, the Ethernet G MAC of which supports the IEEE 1588v2 protocol. It further provides a FlexRay interface, which keeps a time count of the real time clock (Real_Time Clock, RTC) in the dormant state.

Figure 2:
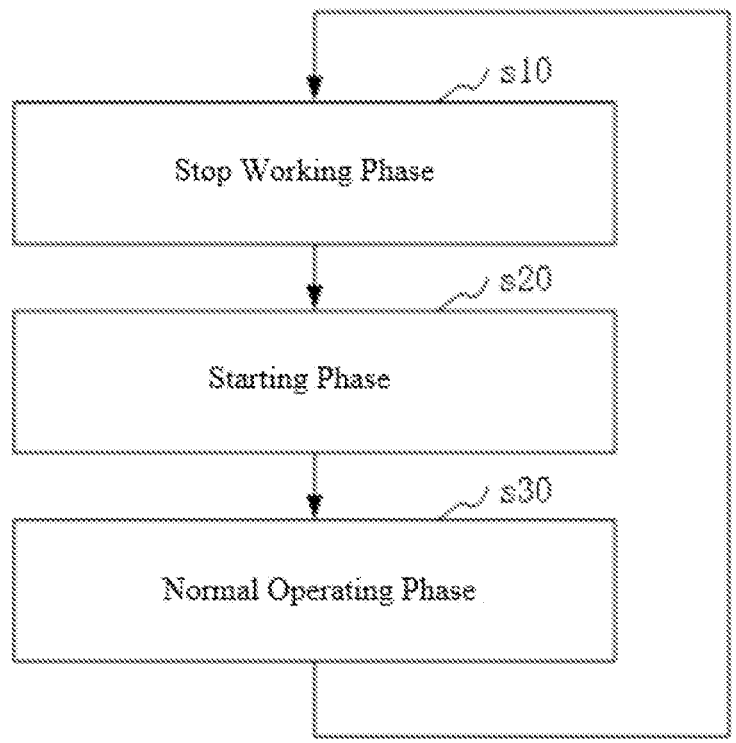
FIG. 2 is a schematic diagram of various stages of a vehicle in one embodiment.

The time synchronization method of the domain controller provided herein, as shown in FIG. 2, may be performed at three different phases: a stop work phase s10 of the vehicle, a startup phase s20 of the vehicle after the stop work phase s10 of the vehicle, and a normal operation phase s30 of the vehicle after the startup phase s20 of the vehicle. It will be appreciated that if the vehicle stops operating in the vehicle normal operating phase s30, the vehicle would again enter the stop working phase s10.

Figure 3:
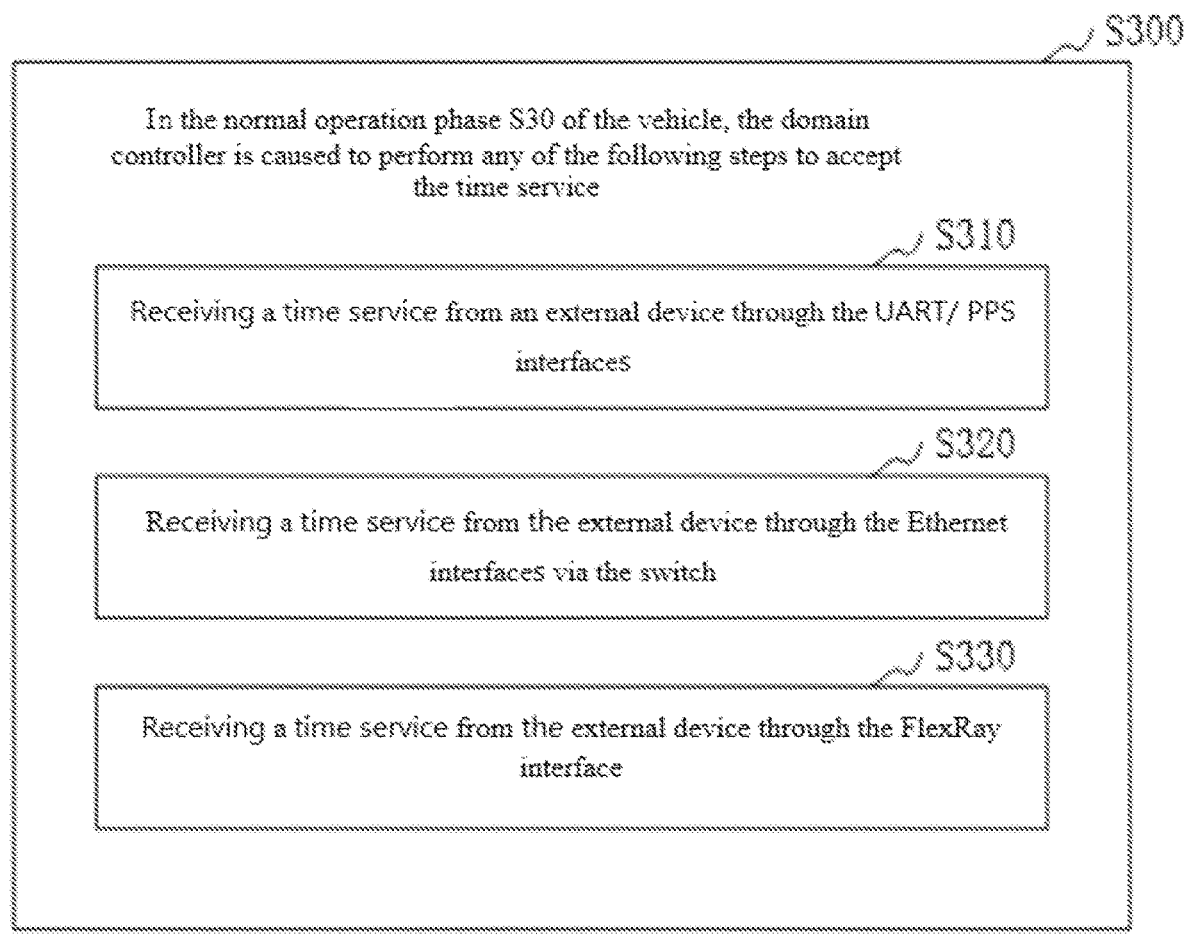
FIG. 3 is a flow diagram of a time synchronization method of a domain controller in one embodiment.

In one embodiment, as shown in FIG. 3, a time synchronization method of a domain controller is provided. S300, in the normal operation phase S30 of the vehicle, the domain controller is caused to perform any of the following steps to accept the time service:

Step S310, receiving a time service from an external device through the UART/PPS interfaces;

Step S320, receiving a time service from the external device through the Ethernet interfaces via the switch; and Step S330, receiving a time service from the external device through the FlexRay interface.

Where, in various embodiments of the disclosure, the external device of the domain controller refers to devices other than the domain controller. The device can be other devices inside the vehicle or devices external to the vehicle, such as other domain controllers within the vehicle, other electronic control units or various sensors, etc., or other devices external to the vehicle, vehicles, etc.

In the time synchronization method of the domain controller described above, the domain controller is mounted in the vehicle. The domain controller is connected to various interfaces such as an Ethernet interface, a universal asynchronous receiver (UART)/pulse per second (PPS) interface, and a FlexRay interface. When time synchronization is made to the domain controller, the time synchronization to the domain controller can be accomplished by selecting either of the interfaces according to the actual requirements and accepting an external time service by performing a time synchronization step corresponding to the interface type. As such, among the multiple domain controllers in a vehicle, or between a domain controller and other components of a vehicle, multiple interfaces provided by the domain controllers can be flexibly connected in tandem to receive time service from each other, thereby effectively improving the diversity of domain controller time synchronization and extensible, which can meet the need for time synchronization of multiple SoCs, MCUs, and multiple sensors of an automated driving domain controller.

In the normal operation phase s30 of the vehicle, the real time clock time inside each individual SoC and the MCU is updated in real time to the time of the external device. If the vehicle stops working in the vehicle normal operation phase s30, and enters into the vehicle's stop work phase s10, each SoC goes into a powered-off state, and the real time clock inside the microcontroller unit continues to keep the clock count on the basis of the current latest update time in preparation for providing the time message broadcast on the controller area network bus at the next cycle vehicle startup phase.

In one embodiment, when the external device in step S310 is a global navigation satellite system timing source, the step S310 of receiving a time service from an external device through the UART/PPS interfaces includes as follows. The main SoC is communicatively connected to the global navigation satellite system (GNSS) timing source through the UART/PPS interfaces. The PPS and a coordinated universal time (UTC) is received from the GNSS timing source. A main SoC time is synchronized to the UTC by the PPS and the UTC. The synchronized main SoC time is taken as a master clock of a precise clock synchronization protocol in the internal local area network of the domain controller. The remaining SoCs among the number of SoCs except the main SoC and the micro control units are taken as the slave clock of the precise clock synchronization protocol. A precise clock synchronization protocol time synchronization is performed on the remaining SoCs and the MCU to the synchronized main SoC time. A real time clock time inside the MCU is updated to the main SoC time and a time message of the MCU is stopped broadcasting on the controller area network bus after the MCU completes the time synchronization of the precise clock synchronization protocol.

Wherein, the GNSS timing source is a device for providing a PPS and UTC required in the global navigation satellite system timing. The device can be a device internal and/or external to the vehicle, for example, the global navigation satellite system timing source can be a global navigation satellite system receiver that receives signals from the global navigation satellite system and provides the PPS and the UTC to the local domain controller. Or the global navigation satellite system timing source can also be an upper level domain controller within the vehicle or other components of the vehicle that act as a global navigation satellite system timing server to provide the PPS and the UTC to the local domain controller.

In one embodiment, the external device in step S320 may be an external clock source external to the domain controller. The step S320 of receiving a time service from the external device through the Ethernet interfaces via the switch includes as follows. The domain controller is communicatively connected to an external clock source through the Ethernet interface via the switch. The external clock source is taken as a master clock of the precise clock synchronization protocol. The number of the SoCs and the MCUs of the domain controller are taken as slave clocks of the precise clock synchronization protocol. A precise clock synchronization protocol time synchronization is performed on the number of the SoCs and the micro control unit of the domain controller to the synchronized main SoC time. A real time clock time inside the MCU is updated to the main SoC time and a time message of the MCU is stopped broadcasting on the controller area network bus after the MCU completes the time synchronization of the precise clock synchronization protocol.

Wherein, the external clock source, an external device of the domain controller, is a device that provides a clock synchronization signal as a master clock of a precise clock synchronization protocol. The device may be a device internal and/or external to the vehicle, such as may be an upper level domain controller within the vehicle or other components of the vehicle, or a timing device or a timing server external to the vehicle, or the like.

In one embodiment, in step S330, the step of receiving a time service by the domain controller through the FlexRay interface includes as follows. The MCU is connected to a vehicle FlexRay bus through the FlexRay interface and a FlexRay bus. The MCU is synchronized to a vehicle device time connected to the vehicle FlexRay bus through a FlexRay time. A real time clock time inside the MCU is updated to the vehicle device time and a time message of the MCU is stopped broadcasting on the controller area network bus after the MCU completes the time synchronization of the precise clock synchronization protocol. The MCU is taken as a master clock of the precise clock synchronization protocol of an internal local area network of the domain controller. The number of the SoCs are taken as slave clocks of the precise clock synchronization protocol. A precise clock synchronization protocol time synchronization is performed on the number of the SoCs to the synchronized main SoC time.

Therein, a vehicle device is a vehicle interior device providing a clock synchronization signal for FlexRay time synchronization to a domain controller, such as an electronic control unit, which may be a vehicle chassis or body as a master clock, and the like.

Figure 4:
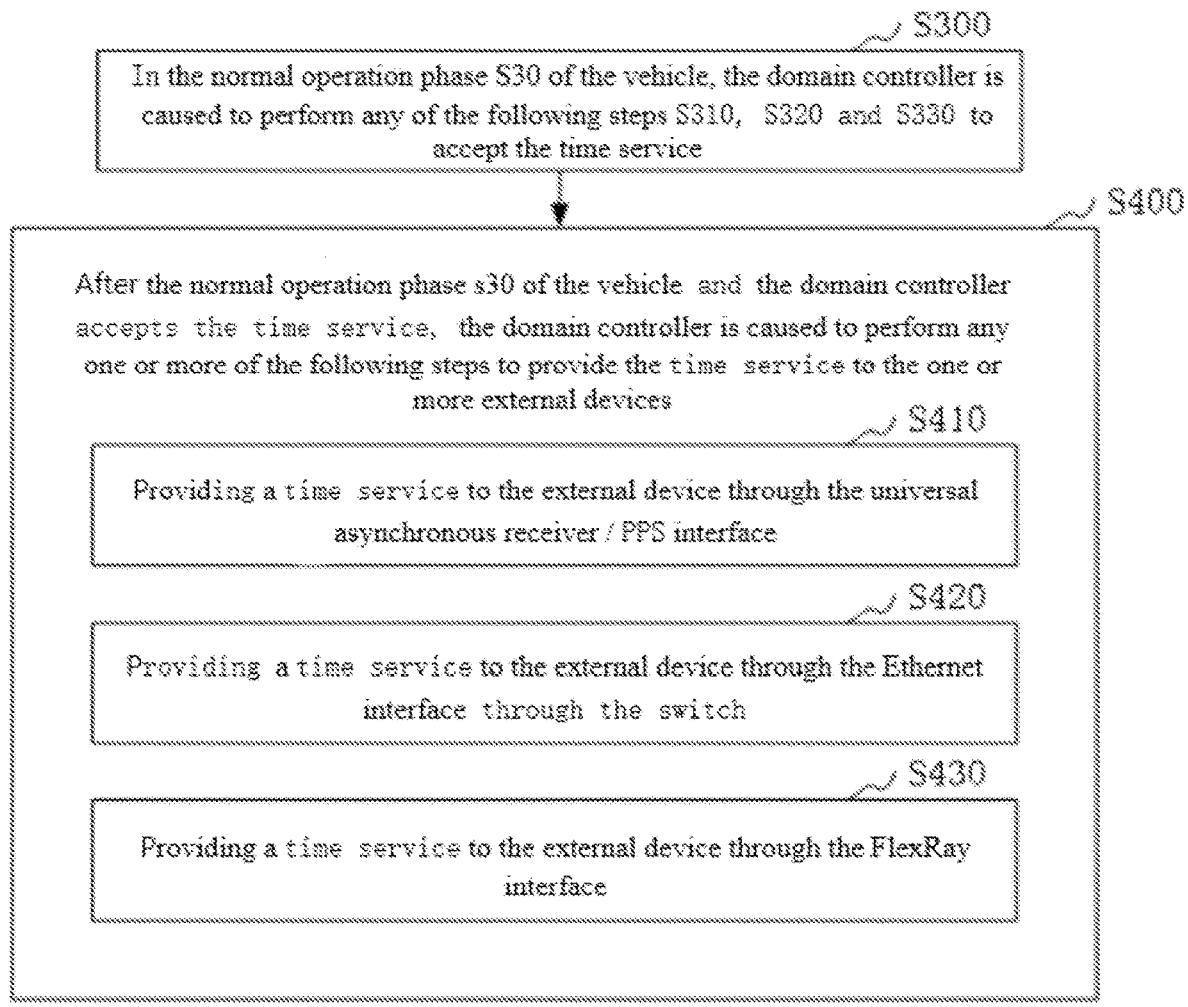
FIG. 4 is a flow diagram of a time synchronization method of a domain controller in another embodiment.

In one embodiment, as shown in FIG. 4, the time synchronization method of the domain controller may further include the step of causing the domain controller to provide a time service. The step of causing the domain controller to provide the time service outward includes as follows.

Step S400, after the normal operation phase s30 of the vehicle, the domain controller completes its own time synchronization by performing any of steps S310, S320, and S330 to accept the time service, the domain controller is caused to perform any one or more of the following steps to provide the time service to the one or more external devices.

Step S410: providing a time service to the external device through the universal asynchronous receiver/PPS interface;

In a cascaded scenario for HashRate expansion, one of the processors of the local controller (e.g., may select the SOC-0 110) may act as the global navigation satellite system timing source after the local controller completes the time synchronization, when the external device outputs a second pulse and coordinates the world through the universal asynchronous receiver/second pulse through step S410 to time service the external device; accordingly, the external device performs step S320 to accept the time service from the local domain controller through the universal asynchronous transfer transmitter/PPS.

Step S420, providing a time service to the external device through the Ethernet interface through the switch;

Wherein, when the external device receives time service through the Ethernet through the step S420, there is a need in the MCLI 120 with one of the number of SoCs 110 and the MCU 120 with one of the processors acting as a Precision Time Protocol (PTP) time synchronized master clock (e.g., the SOC-0 110 may be selected as the master clock for the precise clock synchronization protocol time synchronization). The various sub-components of the external device are operated as a slave clock synchronized with the precise clock synchronization protocol time to provide the precise clock synchronization protocol time synchronization service to the external device. Accordingly, the external device performs the step S320 to accept the time service from the local domain controller.

Step S430, providing a time service to the external device through the FlexRay interface.

Wherein, when the time service is provided to the external device through the FlexRay interface in step S430, there is a need in the MCU 120 with one of the number of SoCs 110 and the MCU 120 in which one of the processors acts as a FlexRay bus connection. A clock synchronization signal of FlexRay is sent over a FlexRay bus to an external device to provide a FlexRay time synchronization service to an external device. Accordingly, the external device performs the step S330 to accept a time service from a local domain controller.

In this embodiment, once the domain controller has completed its own time synchronization, one or more external devices (e.g., next level domain controllers, vehicle sensors, etc. other components or devices external to the vehicle, etc.) may also be provided by one or more of an Ethernet interface, a universal asynchronous receiver/PPS interface, and a FlexRay interface. As such, among the number of the domain controllers in the vehicle, the domain controller and the other devices of the vehicle may be arbitrarily joined by any suitable type of interface as desired to provide time service level by level from the upper level component to the next level component, thereby enabling to complete the timing between the various components in the vehicle flexibility.

Figure 5:
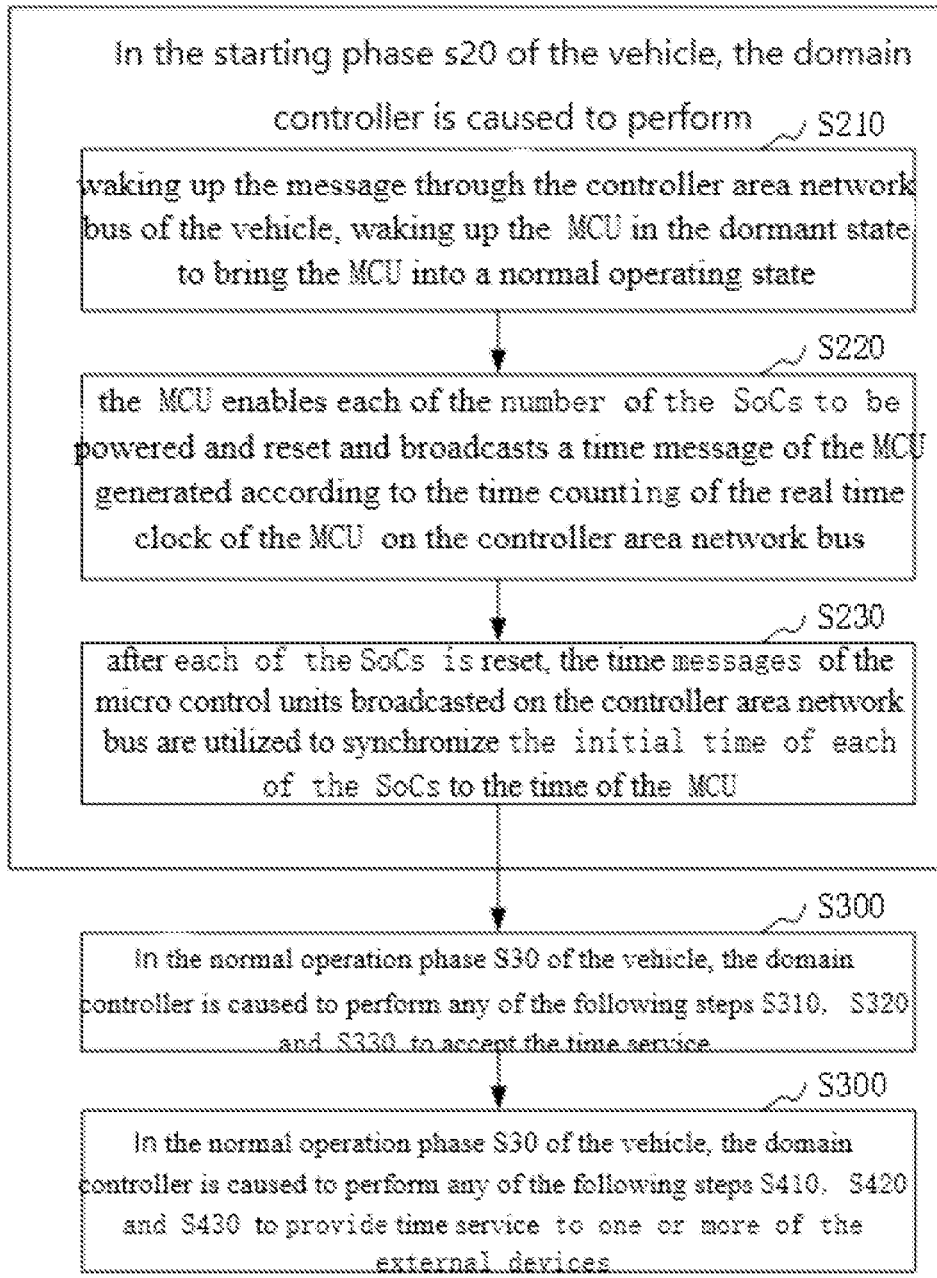
FIG. 5 is a flow diagram of a time synchronization method of a domain controller in accordance with another embodiment.

In one embodiment, as shown in FIG. 5, the time synchronization method of the domain controller of the vehicle prior to the normal operating phase s30 of the vehicle (i.e. S20 the starting phase of the vehicle) further includes:

S210, waking up the message through the controller area network bus of the vehicle, waking up the MCU in the dormant state to bring the MCU into a normal operating state;

Therein, a real time clock of the MCU in a sleep state is maintained counting at a stop work phase s10 of the vehicle.

S220, the MCU enables each of the number of the SoCs to be powered and reset and broadcasts a time message of the MCU generated according to the time counting of the real time clock of the MCU on the controller area network bus.

S230, after each of the SoCs is reset, the time messages of the micro control units broadcasted on the controller area network bus are utilized to synchronize the initial time of each of the SoCs to the time of the MCU.

In this embodiment, prior to the vehicle starting phase, the MCU is in the sleep state and maintain the time counting, which can be performed by waking up each of the SoCs through waking up each of the MCU, thereby eliminating the need for the SoC to hold the RTC chip and the battery without having to replace the battery in order to provide the initial time to the SoC without replacing the battery, effectively reducing device cost, and improving ease of use.

In one embodiment, each of the SoCs includes a safety island processor and a general processor. After each of the SoCs in step S230 is reset, an initial time of each of the SoCs is synchronized to the MCU time by using the time messages of the MCU on the controller area network bus includes as follows. The safety island processors in each of the SoCs are activated after each of the SoCs is reset. The safety island processor receives the time messages of the MCU over the controller area network bus to read the latest initialization time and synchronize the time of the safety island processor itself to the latest initialization time. The safety island processor in each of the SoCs initiates the general processor in the SoC where the safety island processor is located. Each general processor requests the current time of the safety island processor in the SoC where the general processor is located during the boot stage of its embedded system and synchronizes the time of the embedded system of the general processor to the current time of the safety island processor.

With respect to the general processor, the safety island processor of the SoC and the software running on the safety island processor can achieve higher security levels, independent of the general processor, which can be used for functional safety control and information security of the vehicle.

In one embodiment, the time synchronization method of the domain controller further includes recording, by each of the general processors, the boot log of the boot stage with the current time of the requested safety island processor during the boot stage of its embedded system.

Otherwise, the embedded system is in an unsynchronized state, its time being a mirror wrap time or a default initial time (e.g., Jan. 1, 1970).

In this embodiment, the operating system on the general processor starts the log, and the log data is stored on the off-chip eMMC by the persistence software module of the operating system. When the time service is provided to the embedded system in its startup phase, the time of the boot log of the boot phase may be mapped to the current time, rather than all of the boot phases' boot logs being recorded at the mirror wrap time or the default initial time. The time to start the log corresponds to the current time, and when the chip starts to fail, the exact time at which the fault occurred can be found to effectively analyze the cause of the fault.

In one embodiment, at a stop operating phase S10 of the vehicle prior to the starting phase S20 of the vehicle, the MCU is connected to a power source of the vehicle and remains powered on, the SoC is in an off state, the micro control unit is in a sleep state, and the real time clock of the micro control unit maintains a time counting in a sleep state.

In this embodiment, by maintaining the time counting of the real time clock of the MCU in the sleep state, the broadcasting of the time message of the MCU on the domain controller internal controller area network bus using the real time clock of the MCU at the vehicle starting stage S20 is facilitated to provide the domain controller with the initial time synchronization.

It should be understood that while the various steps in the flow diagrams of FIGS. 2-5 are shown in turn in the order of arrows, these steps are not necessarily performed in the order indicated by the arrows. The steps of these steps are not limited by the exact order unless expressly specified herein, and the steps may be performed in other sequences. Moreover, at least a portion of the steps in FIGS. 2-5 may include a number of sub-steps or stages, which are not necessarily performed at the same time, but may be performed at different times, the order of execution of the sub-steps or stages is not necessarily performed in turn, but may be performed in turn or alternatively with at least a portion of the sub-steps or stages of other steps or other steps.

Figure 6:
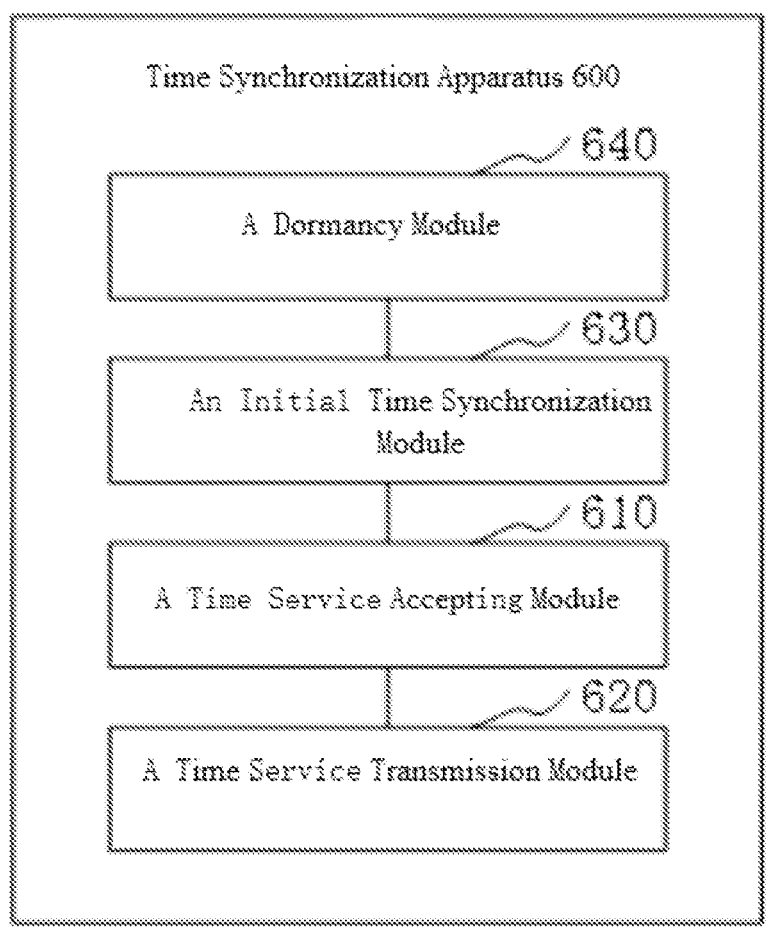
FIG. 6 is a block diagram of a time synchronization apparatus of a domain controller in one embodiment.

In one embodiment, as shown in FIG. 6, a time synchronization apparatus 600 of a domain controller is provided, which may be included in the domain controller 100 for performing time synchronization of the domain controller 100. The domain controller 100 is mounted in a vehicle and includes a number of SoCs 110 and MCUs 120. The number of SoCs 110 and the MCUs 120 are respectively communicatively connected via a controller area network bus and are respectively connected to the switch 130 through Ethernet communication. The switch 130 has an external Ethernet interface 140. The main SoC 111 among the number of SoCs 110 has a pair of external universal asynchronous/second transmitter/PPS interfaces 150. The MCU 120 has an external FlexRay interface 160.

The time synchronization apparatus 600 of the domain controller include a time service accepting module, configured to enable the domain controller to selectively execute any one of the following steps to accept a time service during a normal working phase of the vehicle:

receiving the time service from an external device through the UART/PPS interface;
receiving the time service from an external device through the Ethernet interface through the switch; and
receiving the time service from an external device through the FlexRay interface.

In one embodiment, the time service accepting module 610, when enabling the domain controller to receive the time service from the external device via the universal asynchronous receiver/PPS interface, is further operative to cause: the main SoC to be communicatively connected to the global navigation satellite system timing source through the universal asynchronous receive transmitter/PPS, to receive the pulse per second from the global navigation satellite system timing source, and to synchronize the main SoC time to the UTC using the pulse per second and the UTC, The time synchronized main SoC is taken as the master clock of the precise clock synchronization protocol in the internal local area network of the domain controller, to synchronize the remaining SoCs among the number of SoCs other than the main SoC and the MCU as a slave clock to the precise clock synchronization protocol, to synchronize the remaining SoCs and the micro control unit to the time at which the fine clock synchronization protocol time is synchronized to the main SoC. The real time clock time inside the MCU is updated to the time of the main SoC after the MCU completes the precise clock synchronization protocol time synchronization and stop broadcasting the time messages of the MCU on the controller area network bus.

In one embodiment, the time service accepting module 610, when used to cause the domain controller to accept the time service from the external device through the Ethernet interface via the switch, is further operative to cause: the domain controller to communicatively connect to the external clock source through the Ethernet interface via the switch, to synchronize the external clock source to the master clock of the precise clock synchronization protocol, to synchronize the number of SoCs of the domain controller and the MCU to the slave clock of the precise clock synchronization protocol, to synchronize the number of SoCs of the domain controller and the MCU to execute the precise clock synchronization protocol time to the time of the main SoC; to update the real time clock time inside the MCU to the time of the main SoC and to stop broadcasting the time messages of the MCU on the controller area network bus after the micro control unit has completed the precise clock synchronization protocol time synchronization.

In one embodiment, the time service accepting module 610, when enabling the domain controller to receive the time service from the external device through the FlexRay interface, is further operative to cause: the MCU to connect, via the FlexRay interface, to the FlexRay bus of the vehicle over the FlexRay bus; to synchronize the MCU to the vehicle component of the vehicle FlexRay bus connection over the FlexRay time. After the MCU completes the FlexRay time synchronization, the real time clock time inside the MCU is updated to the time of the vehicle device and the time message of the MCU is stopped broadcasting on the controller area network bus. The MCU is taken as the master clock of the precise clock synchronization protocol of the internal local area network of the domain controller, and the number of SoCs are taken as the slave clock of the precise clock synchronization protocol. The precise clock synchronization protocol time synchronization is performed on the SoCs to synchronize the time of the SoCs to the MCU time.

In one embodiment, the time synchronization apparatus 600 of the domain controller further includes a time service transmission module 620 for causing the domain controller to perform any one or more of the following steps to provide the time service to the one or more external devices upon accepting the time service of the domain controller during the normal operation phase of the vehicle.

receiving the time service from an external device through the UART/PPS interface;

receiving the time service from an external device through the Ethernet interface through the switch; and receiving the time service from an external device through the FlexRay interface.

In one embodiment, the time synchronization apparatus 600 of the domain controller further includes an initial time synchronization module 630 for waking up the message through the controller area network bus of the vehicle. The MCU in the sleep state is waked up to cause the MCU to enter a normal operating state in a starting phase of the vehicle prior to the normal operation phase of the vehicle. The MCU enables each of the number of SoCs to cause each SoC to be powered and reset and to broadcast on the controller area network bus a time message of the MCU generated according to the time counting of the real time clock of the MCU. The time messages of the MCU broadcasted on the controller area network bus after each of the SoCs is reset to synchronize the various SoC initial time to the time of the MCU.

In one embodiment, the initial time synchronization module 630 is configured to, after the time messages used to broadcast the MCU on the controller area network bus and after the reset of each of the SoCs, synchronize the initial time of the various SoC to the MCU time, further for enabling the safety island processors in each of the SoCs to boot after each of the SoCs is reset. The safety island processor receives the time messages of the MCU through the controller area network bus to read the latest initialization time and modifies the time of the safety island processor itself to the latest initialization time. The safety island processor in each of the SoCs initiates a general processor in the SoC where the safety island processor is located. Each general processor requests the current time of the safety island processor in the SoC where the general processor is located during the boot stage of its embedded system and synchronizes the time of the embedded system of the general processor to the current time of the safety island processor.

In one embodiment, the initial time synchronization module 630 is further configured to cause each of the general processor to record the startup log of the starting phase with the current time of the requested safety island processor during the starting phase of its embedded system.

In one embodiment, the time synchronization apparatus 600 of the domain controller further includes a dormancy module 640 for stopping the operation phase of the vehicle prior to the activation phase of the vehicle such that the MCU is connected to the power source of the vehicle and remains powered on, the SoC is in a power-off state, the MCU is in a sleep state, and the real time clock of the MCU maintains a time counting in the sleep state.

The specific definition of the time synchronization apparatus 600 with respect to the domain controller may be referred to above with respect to the time synchronization method of the domain controller, and will not be repeated herein. The various modules in the time synchronization apparatus 600 of the domain controller described above may be implemented in whole or in part by software, hardware, and combinations thereof. The modules described above may be embodied in hardware, in a processor in a computer device, or in a memory in a computer device, in software, in order to facilitate processor calls to perform the operations corresponding to the various modules above.

In one embodiment, as shown in FIG. 1, a domain controller 100 mounted in a vehicle is provided. The domain controller 100 includes a number of SoCs 110 and MCUs 120. The number of SoCs 110 and the MCUs 120 are respectively communicatively connected via a controller area network bus and are respectively connected to the switch 130 through an Ethernet communication. The switch 130 has an external Ethernet interface 140. A main SoC 111 among the number of the SoCs 110 has external universal asynchronous/second transmitter/PPS interfaces 150. The MCU 120 has an external FlexRay interface 160.

The domain controller 100 performs the following steps:
the domain controller 100 is enabled to perform anyone of the steps to receive a time service during the normal operation phase of the vehicle:
receiving the time service from an external device through the UART/PPS interface;
receiving the time service from an external device through the Ethernet interface through the switch; and
receiving the time service from an external device through the FlexRay interface.

In other embodiments, the domain controller also performs the steps of the synchronization method of the domain controller as in any of the above embodiments and has corresponding benefits.

In one embodiment, a time synchronization system of a vehicle is also provided. The time synchronization system of the vehicle is mounted in a vehicle. The time synchronization system of the vehicle includes a number of domain controllers cascaded with each other, Each domain controller of the number of domain controllers can be a domain controller of any of the above embodiments.

During the normal operation phase of the vehicle, among the number of domain controllers, each domain controller is cascaded up with one domain controller or vehicle component up through one of its Universal Asynchronous Receiver/PPS interfaces, Ethernet interfaces, and FlexRay interfaces, and received from the domain controller or vehicle device, and the each domain controller can cascade with one or more domain controllers and/or vehicle devices down through its Universal Asynchronous Receiver/PPS interface, Ethernet interface, and other interfaces in the FlexRay interface, other than the master interface, and provide a time service to the one or more domain controllers and/or vehicle devices to complete the time synchronization of all of the number of domain controllers and one or more vehicle devices.

It is understood that two domain controllers cascaded with each other may be cascaded directly, or indirectly through vehicle devices that are not domain controllers present therebetween.

In this embodiment, at the vehicle assembly stage, the developer can utilize a variety of interfaces that the domain controller has, flexibly cascading a number of domain controllers and one or more vehicle devices to each other in accordance with a predetermined structure, so that during normal operation of the vehicle, the time synchronization of all domain controllers and vehicle devices in the synchronous network can be accomplished in accordance with the predetermined structure between the respective domain controllers and vehicle devices in the synchronous network. The architecture of the synchronous network may be flexibly designed according to practical requirements, effectively improving the scalability of device time synchronization in the vehicle.

In one embodiment, a computer device is provided that includes a memory and a processor having stored therein a computer program that, when executed, implements the following steps:

During the normal operation phase of the vehicle, the domain controller is caused to perform any one of the steps to receive a time service.
receiving the time service from an external device through the UART/PPS interface;
receiving the time service from an external device through the Ethernet interface through the switch; and
receiving the time service from an external device through the FlexRay interface.

In other embodiments, the processor, when executing the computer program, also implements the steps of the time synchronization method of the domain controller as in any of the above embodiments and has corresponding benefits.

In one embodiment, a computer readable storage medium is provided having stored there on a computer program which, when executed by a processor, performs the following steps:

During the normal operation phase of the vehicle, the domain controller is caused to perform any one of the steps to receive a time service.
receiving the time service from an external device through the UART/PPS interface;
receiving the time service from an external device through the Ethernet interface through the switch; and
receiving the time service from an external device through the FlexRay interface.

In other embodiments, a computer program, when executed by a processor, also implements the steps of a time synchronization method of a domain controller as in any of the above embodiments and has corresponding benefits.

It will be appreciated by one of ordinary skill in the art that all or part of the processes implemented in the methods described above can be accomplished by computer program instructions that can be stored in a non-transitory computer readable storage medium that, when executed, can comprise a flow of an embodiment of the methods as described above. Any references to memory, storage, databases, or other media used in the embodiments provided herein may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), etc.

The various technical features of the embodiments above may be combined in any combination to describe every possible combination of the various technical features in the embodiments described above, however, as long as the combination of these technical features does not contradict the conflict, it is to be considered the scope recited in this specification.

The embodiments described above represent only a few embodiments of the present application, which are described in greater detail and detail, but are not to be construed as limiting the scope of the invention. It should be noted that many variations and modifications may be made by one of ordinary skill in the art without departing from the concepts of the present application, which fall within the scope of the present application. The scope of the invention should, therefore, be determined with reference to the appended claims.

What is claimed is:

1. A time synchronization method for a domain controller; the domain controller is mounted in a vehicle and comprises a plurality of system-on-chips (SOCs) and micro control units (MCUs); the plurality of the SOCs and the MCUs are respectively communicatively connected by a controller area network bus and are respectively communicatively connected to a switch via an Ethernet; the switch has external Ethernet interfaces; a main SOC among the plurality of the SOCs has external universal asynchronous receiver/transmitter (UART)/pulse per second (PPS) interfaces; and each of the micro control units has an external FlexRay interface; wherein the method comprises:
    causing the domain controller to, under a normal operating phase of the vehicle, perform any of the steps as follows:
    receiving a time service from an external device through the UART/PPS interfaces wherein the external device is another device inside the vehicle or a device on the external of the vehicle;
    receiving a time service from the external device through the Ethernet interfaces via the switch;
    and receiving a time service from the external device through the FlexRay interface.

2. The time synchronization method for a domain controller of claim 1, wherein the step of
    receiving a time service from an external device through the IJART/PPS interfaces comprises:
    communicatively connecting to global navigation satellite system (GNSS) timing source by the main SOC through the UART/PPS interfaces; receiving the PPS from the GNSS timing source and a coordinated universal time (UTC); and synchronizing a main SOC time to the UTC by the PPS and the UTC;
    taking the synchronized main SOC time as a master clock of a precise clock synchronization protocol in the internal local area network of the domain controller; taking the remaining SOCs among the plurality of SOCs except the main SOC and the micro control units as the slave clock of the precise clock synchronization protocol; and performing precise clock synchronization protocol time synchronization on the remaining SOCs and the MCU to the synchronized main SOC time; and
    updating a real time clock time inside the MCU to the main SOC time and stopping broadcasting a time message of the MCI_J on the controller area network bus after the MCI_J completes the time synchronization of the precise clock synchronization protocol.

3. The time synchronization method for a domain controller of claim 1, wherein the step of receiving a time service from the external device through the Ethernet interfaces via the switch comprises:
    communicatively connected to an external clock source by the domain controller through the Ethernet interface via the switch; taking the external clock source as a master clock of the precise clock synchronization protocol; taking the plurality of the SOCs and the MCUs of the domain controller as slave clocks of the precise clock synchronization protocol; performing precise clock synchronization protocol time synchronization on the plurality of the SOCs and the micro control unit of the domain controller to the synchronized main SOC time; updating a real time clock time inside the MCU to the main SOC time and stopping broadcasting a time message of the MCU on the controller area network bus after the MCU completes the time synchronization Of the precise clock synchronization protocol.

4. The time synchronization method for a domain controller of claim 1, wherein the step of receiving a time service from the external device through the FlexRay interface comprises:
    connecting to a vehicle FlexRay bus, by the MCU, through the FlexRay interface and a FlexRay bus; synchronizing the MCU to a vehicle device time connected to the vehicle FlexRay bus through a FlexRay time;
    updating a real time clock time inside the MCU to the vehicle device time and stopping broadcasting a time message of the MCU on the controller area network bus after the MCU completes the time synchronization of the precise clock synchronization protocol;
    taking the MCU as a master clock of the precise clock synchronization protocol of an internal local area network of the domain controller; taking the plurality of the SOCs as slave clocks of the precise clock synchronization protocol; performing precise clock synchronization protocol time synchronization on the plurality of the SOCs to the synchronized main SOC time.

5. The time synchronization method for a domain controller of claim 1, further comprising: under a normal operating phase of the vehicle and after the domain controller accepts the time service, causing the domain controller to perform any one or more of the following steps to provide the time service to one or more external devices; providing, the time service to external devices via the UART/PPS interfaces;
    providing the time service to external devices through the Ethernet interface via the switch; and
    providing the time service to external devices via the Flex Ray interface.

6. The time synchronization method tar a domain controller of claim 1, wherein during a start-up phase of the vehicle prior to the normal operating phase of the vehicle, the method further comprises:
    waking up the MCU in a dormant state through a wake-up message of a controller area network bus of a vehicle, so that the Mal enters a normal working state;
    powering, resetting each SOC in the plurality of SOCs by the MCU and broadcasting a time message of the MCU generated according to a time count of a real-time clock of the MCU on the controller area network bus; and
    synchronizing an initial time of each of the SOCs to the time of the MCU by using the time message of the MCU broadcasted on the controller area network bus after each of the SoCs is reset.

7. The time synchronization method for the domain controller of claim 6, wherein the step of synchronizing an initial time of each of the SOC to the time of the MCU by using the time message of the MCU broadcasted on the controller area network bus after each of the SOCs is reset comprises:
    starting a safety island processor in each of the SOCs after each of the SOCs is reset, receiving the time message of the MCU by the safety island processor through the controller area network bus so as to read a latest initialization time and correct the time of the safety island processor to the latest initialization time;
    initiating; by the safety island processor in each of the SoCs, a general processor in the SOC where the safety island processor is located; and requesting, by each of the general processor, the current time of the safety island processor in the SOC where the general processor is located through an inter-core communication mode in a starting state of the embedded system and synchronizing the time of the embedded system of the general processor to the current time of the safety island processor.

8. The time synchronization method far a domain controller of claim 6, wherein in a stop phase of the vehicle before the start phase of the vehicle, the MCU is connected to a power supply of the vehicle and is kept powered on; the SOC is in a power-off state, and the MCU is in a sleep state; and the real-time clock of the MCU maintains time counting, in the sleep state.

9. A time synchronization apparatus of a domain controller for performing time synchronization of a domain controller, wherein the domain controller is mounted in a vehicle: the domain controller comprises a pluraltty of system-on-chips (SOCs) and micro control units (MCUs): the plurality of SOCs and the MCUs are respectively communicatively connected through a controller area network bus and are respectively connected to a switch through an Ethernet communication; the switch is provided with external Ethernet interfaces: a main SOC in the plurality of SOCs is provided with an external universal asynchronous receiver! transmitter (UARTY pulse per second (PPS) interface; and each of the MCUs is provided with an external FlexRay imerface; the time synchronization apparatus of a domain controller comprises:

a time service accepting module, configured to enable the domain controller to selectively execute any one of the following steps to accept a time service during a normal working phase of the vehicle: receiving the time service from an external device through the UART/PPS interface wherein the external device is another device inside the vehicle or a device on the external of the vehicle: receiving the time service from an external device through the Ethernet interface through the switch: and receiving the time service from an external device through the FlexRay interface.

10. A domain controller mounted in a vehicle, comprising a plurality of system-on chips (SOCs) and micro control units (MCUs); wherein the plurality of the SOCs and the MCUs are respectively communicatively connected by a controller area network bus and are respectively communicatively connected to a switch through an Ethernet, the switch is provided with external Ethernet interfaces; a main SOC among the plurality of the SOCs is provided external universal asynchronous receiver/transmitter (UART)/pulse per second (PPS) interfaces; and each of the MCUs is provided with an external FlexRay interface; and the domain controller implements the steps of a time synchronization method for the domain controller of claim 1.

11. A non-transitory computer readable storage medium having stored there on a computer program, the computer program, when executed by a processor, implements the steps of a time synchronization method for the domain controller of claim 1.

* * * * *